United States Patent [19]
Koch et al.

[11] 3,867,756
[45] Feb. 25, 1975

[54] ARRANGEMENT FOR CHANGING TOOL-SUPPORTING TOOL HOLDERS ON A MACHINE TOOL ASSEMBLY

[75] Inventors: Hans Joachim Koch, Hannover-Buchholz; Wolfgang Schaefer, Langenhagen, both of Germany

[73] Assignee: Werkzeumaschinenfabrik Gildemeister & Comp. A.G., Bielefeld, Germany

[22] Filed: July 13, 1973

[21] Appl. No.: 378,981

[30] Foreign Application Priority Data
July 14, 1972 Germany.......................... 2234676

[52] U.S. Cl. .............................................. 29/568
[51] Int. Cl. ............................................ B23q 3/155
[58] Field of Search ....................................... 29/568

[56] References Cited
UNITED STATES PATENTS
3,584,374   6/1971   Spuhler ............................. 29/568
3,667,114   6/1972   Smith et al. ........................ 29/568

FOREIGN PATENTS OR APPLICATIONS
2,031,219   1/1971   Germany ........................... 29/568

*Primary Examiner*—Andrew R. Juhasz
*Assistant Examiner*—Z. R. Bilinsky

[57]   ABSTRACT

An arrangement for changing tool-supporting tool holders on a machine tool assembly including an installation for clamping the tool holders and moving the tool holders in a linear movement between two clamping positions on a turret and a belt magazine, the tool holder and clamping installation having cooperative groove and plunger means extending at a small acute angle relative to the linear movement so as to prevent interference between the various components during the tool holder changing sequence.

3 Claims, 12 Drawing Figures 3,867,756

ARRANGEMENT FOR CHANGING TOOL-SUPPORTING TOOL HOLDERS ON A MACHINE TOOL ASSEMBLY

FIELD OF THE INVENTION

The present invention relates to an arrangement for changing tool-retaining tool holders on a machine tool assembly.

DISCUSSION OF THE PRIOR ART

An arrangement of that type is generally known from German Offenlegungsschrift No. 20 31 219. In the case of this known arrangement, the clamping position of a tool holder in a magazine, selected for changing, is precisely located over a corresponding clamping position at the turret head, in effect, the two clamping positions thereof are aligned in the direction of a longitudinal recess and a rib. Consequently, this makes it possible that the edge of the to-be-changed tool holder upon displacement thereof from the magazine toward the turret, contacts the edge of the clamping installation on the turret, due to the unavoidable machine tolerances. Additionally, the relative movement between the abutment or bearing surfaces, formed by the rib and the recess of the tool holder and the clamping installation on the turret is concerned with friction and consequently, wear.

SUMMARY OF THE INVENTION

The present invention has as an object the design of the arrangement so as to prevent impingement between the aforementioned edges as well as friction, so as to thereby preclude wear of the above-described abutment surfaces.

BRIEF DESCRIPTION OF THE DRAWINGS

An exemplary embodiment of the present invention is described hereinbelow with reference to the accompanying drawings, in which.

DETAILED DESCRIPTION

Figure 1:
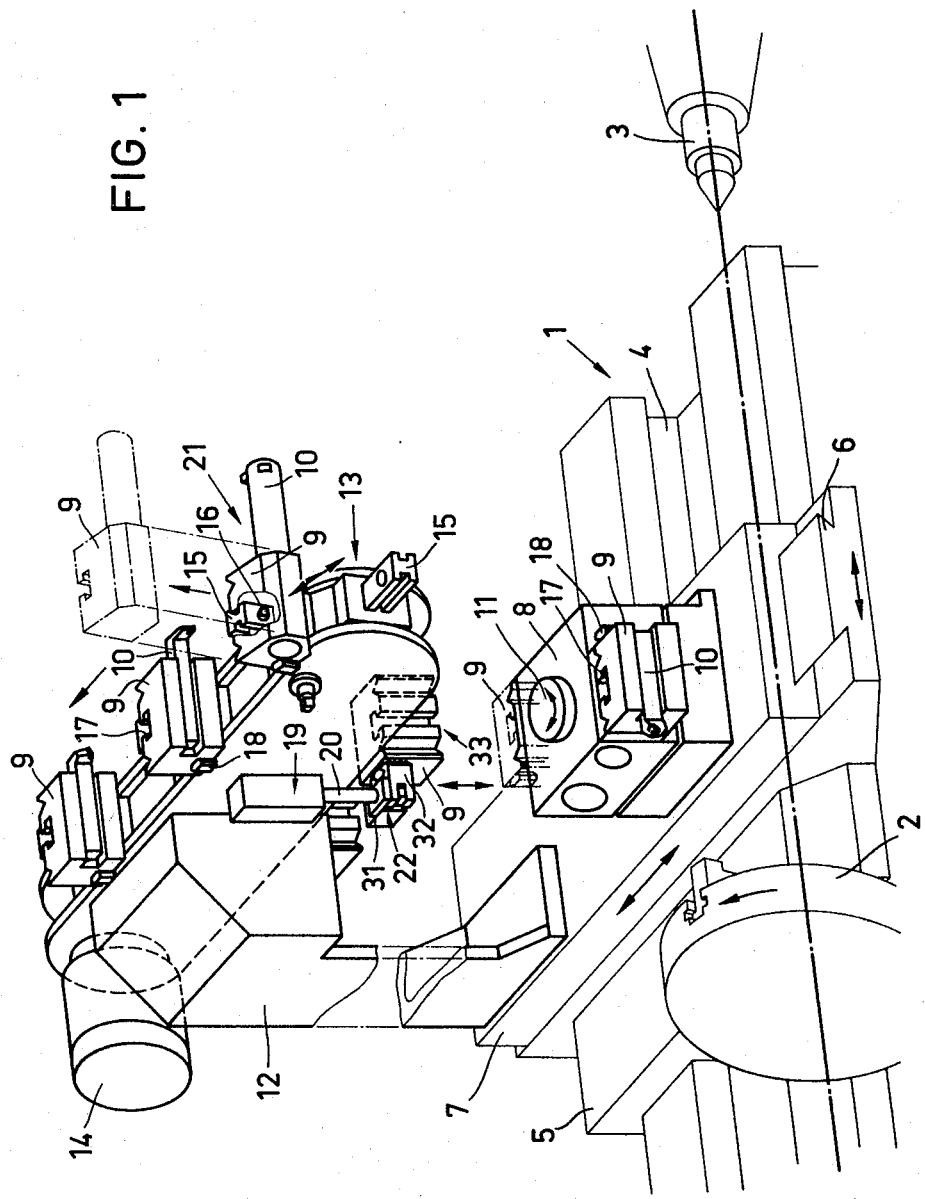
FIG. 1 shows a perspective view of an embodiment of a tool holder arrangement according to the invention mounted on a lathe.

FIG. 1 shows a lathe 1 having a chuck 2 and a tailstock 3. A slide 5 is supported in a bed 4 so as to be displaceable parallel to the latter rotational axis. The slide 5 has a guideway 6 on which a further slide 7 is displaceable transversely relative to the rotational axis.

A turret 8 is disposed on the slide 7 so as to be pivotable about a vertical axis 11. The turret 8 is adapted to receive two tool holders 9 at diametrically opposed locations. As shown in FIG. 1, the tool holder disposed forwardly on the turret 8 supports a tool 10. This tool holder is in its operative position. The tool holder 9 rearwardly disposed on the turret 8 is in the changing position.

Furthermore, disposed on the slide 7 is a console or a bracket 12 having a belt magazine 13 secured thereto. The belt magazine is actuated by a motor 14. The belt magazine is provided with a plurality of carrier studs for the tool holders 9. The tool holders 9 are each provided with a T-shaped slot 17 by means of which they can be slid onto the carrier studs 15 having corresponding double-I-shapes in profile. In order to retain the tool holders 9 on the carrier studs, there are employed hydraulically actuable compressive plungers 16.

The "change" position on the magazine is designated by reference numeral 33. In order to transfer the tool holders 9 disposed in this position into the corresponding "change" position on the turret, there is employed a transfer device which is formed by a piston-cylinder arrangement 19. Disposed at the piston rod 20 is a gripper device 22 having gripping claws 31, 32. Arranged laterally at each tool holder is a gripping element 19 adapted to be engaged by the gripper arrangement.

Figure 4A:
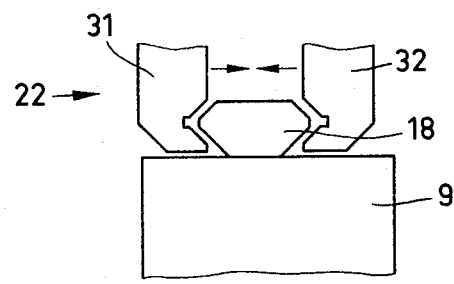
FIGS. 4a and b show, respectively, in plan and side elevation views the gripping claws of a gripper device and the corresponding gripping element on a tool holder.
Figure 4B:
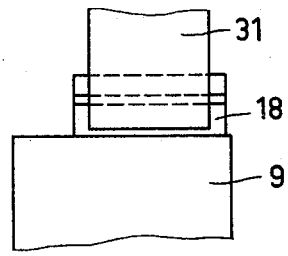

The gripper arrangement is provided with two gripping claws 31, 32 adapted to be moved apart or towards each other. The cooperation of the gripping claws 31, 32 with the gripping element is shown in FIGS. 4a and b.

By extending the piston rod 20 of the piston-cylinder device 19, the tool holders 9 can be moved from the change position 33 on the belt magazine 13 into the corresponding change postion on the turret 8. As previously stated, if the turret 8 is able to receive two tool holders 9; then correspondingly it is provided with two tool holder-clamping installations. Each tool holder-clamping installation has two prism-like ribs 25, 26 and, disposed therebetween, a hydraulically actuatable "mushroom"-like plunger 23 having a plunger head 24 (see FIG. 2). The plunger 23 associated with the change position on the turret 8 is extended during the change procedure to an extent so that the T-groove in the tool holder 9 displaced downwardly by the transfer device 19 receives therein this plunger head 24. In order to assure precise fastening against lateral displacement of the tool holder 9 on the turret, the tool holders are each formed with two elongate recesses 27, 28 conforming to the ribs 25, 26. When the tool holder 9 in FIG. 2, after completion of the change sequence, has reached a clamping position, a pull is exerted on the plunger 23, through which the plunger head pulls the tool holder against the ribs 25, 26. Consequently, in view of the foregoing, the corresponding abutment faces of the longitudinal recesses 27, 28 and of the ribs 25, 26 come into full contact and fasten the tool holder 9 on the turret 8. The gripper installation 22 may then be released from the gripping element 18 and again upwardly displaced.

Figures 3A, 3B, 3C:
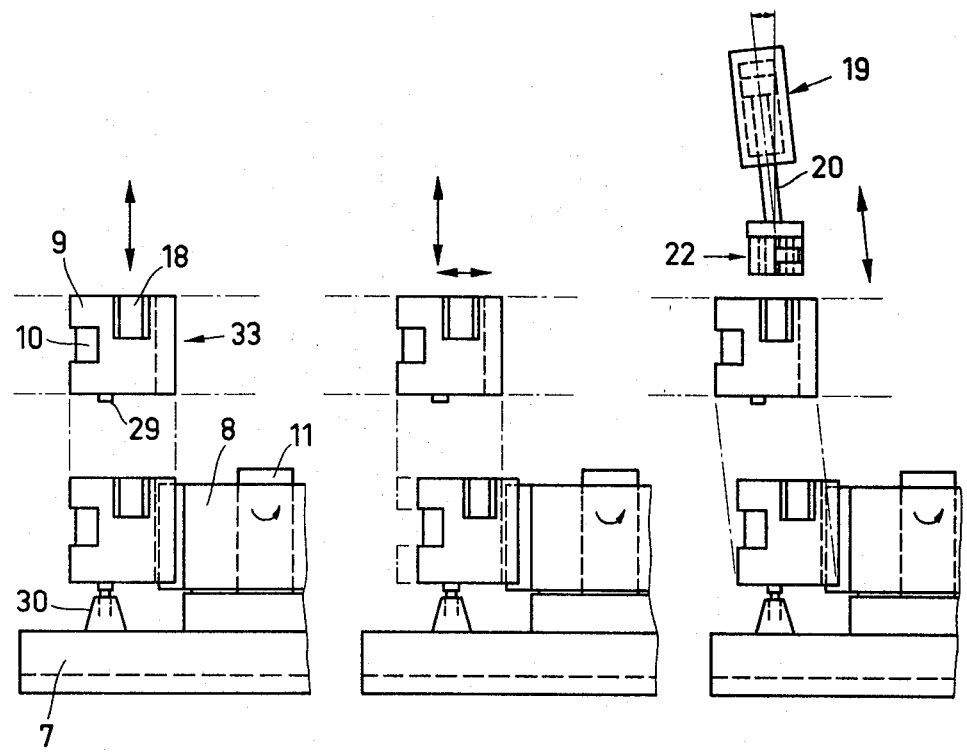
FIGS. 3a, b and c are diagrammatic illustrations of a changing sequence elucidating the operative principle of the invention.

FIG. 3 elucidates the underlying principle of the invention. When the change position 33 on the belt magazine is located precisely above the change position of the turret 8, in such manner that the tool holders 9 in these two positions are in an alignment in both the direction of the ribs and longitudinal recesses, then the lower edge of the tool holder 9 may, due to unavoidable machine tolerance, impinge during the downward movement against the upper edge of the clamping installation on the turret. Additionally, the corresponding abutment surfaces of the ribs 25, 26 and of the longitudinal recesses 27, 28 are subject to wear due to abrasion. This wear shortens the service life of the arrangement as is shown in FIG. 3a.

A known possibility for avoiding the foregoing disadvantages is shown in FIG. 3b. In accordance therewith, the tool holder 9 first of all is vertically lowered out of the change position 33 on the belt magazine into an intermediate position and is then displaced horizontally towards the clamping installation on the turret and into a clamping position. However, this operative solution is costly and time-consuming.

The underlying principle of the invention is shown in FIG. 3c. There, the longitudinal recesses and ribs, on the one hand, and the direction of linear movement of the piston rod 20, on the other hand, are at a small angle relative to each other. This angle is so selected that the tool holder 9 is, in the lowered position of the piston rod 20, in a clamping position. In effect, this indicates that the tool holder 9 is no longer required to perform, for clamping at the clamping device associated with the change position, a horizontal movement on the turret, as in the case of the illustration in FIG. 3b. Upon removing the tool holder 9 from the turret 8, i.e. upon movement of the piston rod 20 from its upwardly extended position, the abutment surfaces of the longitudinal recesses 27, 28 move away from those of the ribs 25, 26 due to the small acute angle, and consequently no abrasion takes place. If, on the other hand, a tool holder 9 is lowered from the change position 33 in the magazine into the change position (clamping position) on the turret, then due to the small acute angle there can be no collision of the lower edge of the tool holder 9 with the upper edge of the clamping installation on the turret. In order to limit the linear movement during transfer of a tool holder 9 out of the magazine 13 onto the turret 8, there is employed a stop 30 which is disposed on the slide 7 and which cooperates with a contact element 29 located at the underside of the tool holder 9.

FIGS. 5a to e show various embodiments of the clamping device on the turret and also of the ribs and longitudinal recesses which suitable for fixing a tool holder 9 on the turret 8 against any lateral displacement.

Figure 2:
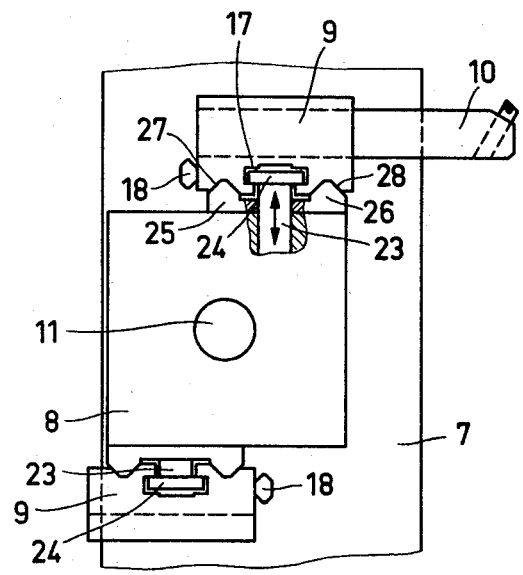
FIG. 2 shows a plan view of the turret.
Figure 5A:
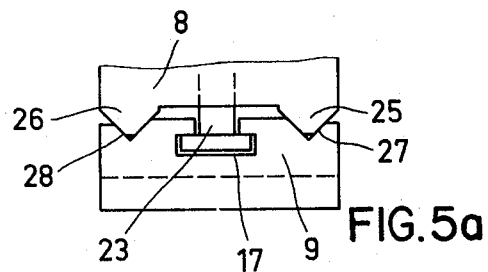
FIGS. 5a to e show, in an enlarged scale, various embodiments of the ribs and longitudinal recesses on the tool holders and the tool holder-clamping installation on the turret.

FIG. 5a shows the embodiment, already discussed in connection with FIG. 2, of the clamping installation drawn to a larger scale.

Figure 5D:
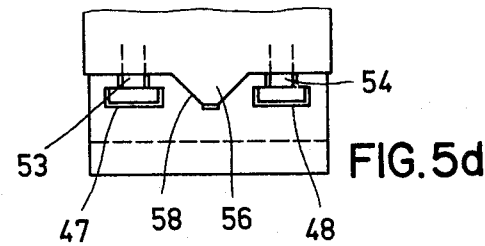
Figure 5B:
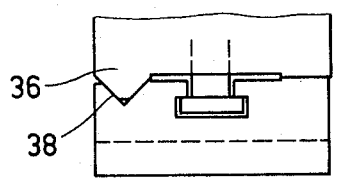

Referring to FIG. 5b, the illustrated clamping installation on the turret 8 has only one prism-like rib 36. Correspondingly, the tool holder 9 also has only one longitudinal recess 38.

Figure 5E:
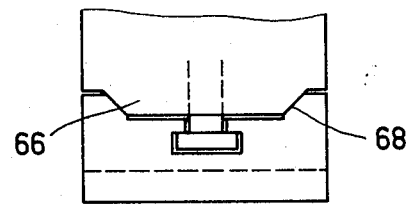
Figure 5C:
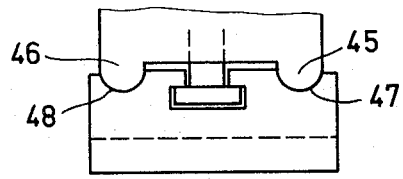

Referring to FIG. 5c, the clamping installation has two ribs 45, 46 of semicircular cross-section. Correspondingly, the tool holder 9 also is formed with two longitudinal recesses 47, 48 which, again, have semicircular cross-sections.

Referring to FIG. 5d, the clamping installation also has only one rib 56 and the tool holder 9 only one longitudinal recess 58. However, in this case, the tool holder 9 is provided with two T-grooves 47,148 and the clamping installation correspondingly provided with two plungers 53, 54.

Referring to FIG. 5e, the clamping installation again has only one rib 66; the latter is, however, wider in comparison with the ribs according to FIGS. 5a, b and d. Here again, the longitudinal recess 68 also is correspondingly wider.

The mode of operation of the inventive tool holder arrangement will now be described with reference to FIG. 1:

The belt magazine 13 is, in the loading position 21, loaded with tool holder 9 which support or mount various tools. It is to be assumed that the turret 8 is provided with two tool holders 9, one of which is in the operative position while the other is in the "change" position. In this case, a carrier stud 15 may be empty on the belt magazine 13. In order to effect changing, the belt magazine 13 is so displaced by the motor 14 whereby the free or empty carrier stud 15 is located above the change position on the turret 8. The piston rod 20 of the piston-cylinder device 19 is then displaced downwardly, so that the opened claws 31, 32 receive between them the gripping element 18 of the tool holder which is located in the change position on the turret 8. The claws 31, 32 are then pulled together whilst the plunger 23 is concurrently extended so as to thereby cause the clamping installation to release the tool holder 9. The piston rod 20 is then displaced upwardly by the piston-cylinder device 19. While this is being done, the tool holder 9 is pushed, with the T-groove 17, onto the free or empty carrier stud 15. At the completion of this linear movement, the tool holder 9 is then arrested on the carrier stud 15 through extension of the holding pin 16. Simultaneously, the claws 31, 32 of the gripper installation 22 are released from the gripping element 18 and displaced upwardly together with the piston rod 20 to such an extent so that the gripper installation 22 is without the zone of movement of the gripping element 18 when the magazine 13 continues its travel. A further tool holder 9 is then conveyed into the change position on the magazine 13. Lowering of this tool holder into the now free change position on the turret 8 is effected in the reverse sequence relative to what has been described hereinabove. Since there is always one tool holder 9 in the working position on the turret 8, changing involves no idle time for the machine.

While there has been shown what is considered to be the preferred embodiment of the invention, it will be obvious that modifications may be made which come within the scope of the disclosure of the specification.

We claim:

1. Arrangement for changing tool-supporting tool holders on a machine tool assembly, such as a lathe, comprising at least one workpiece holder; a tool turret having at least two tool holder clamping means and being displaceable relative to said workpiece holder; a tool holder magazine positioned above said turret and displaceable in directions corresponding to said turret displacement; a tool holder transfer means for transferring said tool holders back and forth between the magazine and the turret, said tool holder transfer means including gripper means for the tool holders to be transferred and being adapted to, on changing being effected, transferring a particular tool holder out of a clamping position in said magazine in a single rectilinear linear movement into a clamping position on said turret and conversely; each said clamping means on said turret being provided with at least one rib extending in the direction of the liner movement thereof and each tool holder being provided with a complementary longitudinal recess, said longitudinal recess and said rib, and the direction of said linear movement being at a small acute angle with respect to each other, so that the ribs and the longitudinal recess are separated from each other perpendicular to the longitudinal direction of the rib and the longitudinal recess when the particular tool post is displaced by said tool holder transfer means from a change position identical with the clamping position on said turret to the magazine, thereby performing said linear movement.

2. Arrangement as claimed in claim 1, each said tool holder having a groove widening towards the interior of said tool holder, said two clamping means on said turret each having at least one mushroom-shaped plunger adapted to be extended out of the turret by a friction and pressing mechanism and adapted to be retracted once again into the said turret, the plunger head being positionable in said groove and having a width larger than the narrowest width of the groove, said groove extending substantially in parallel with the direction of said linear movement, said groove upon linear movement of the tool holder and said gripper means being adapted be slid over the head of the extended plunger, said small acute angle being limited whereby the groove in the tool holder is enabled to slide over the mushroom-shaped plunger head.

3. Arrangement as claimed in claim 1, comprising a stop arranged adjacent the turret for limiting the linear movement of a particular tool holder toward said turret upon transfer of said holder from the magazine to the turret.

* * * * *